(12) United States Patent
Beckman et al.

(10) Patent No.: US 8,049,910 B2
(45) Date of Patent: Nov. 1, 2011

(54) CONFIGURABLE SINGLE SUBMISSION EVENT PRINTER

(75) Inventors: Orhan E Beckman, Hood River, OR (US); Robert D. Walton, Santa Ana, CA (US); Tim Stefl, Middleton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1219 days.

(21) Appl. No.: 11/741,928

(22) Filed: Apr. 30, 2007

(65) Prior Publication Data

US 2008/0266584 A1 Oct. 30, 2008

(51) Int. Cl.
*G06F 3/12* (2006.01)
(52) U.S. Cl. ........ 358/1.13; 358/1.1; 358/1.9; 358/1.14; 358/1.15; 358/1.18
(58) Field of Classification Search .......... None
See application file for complete search history.

(56) References Cited

U.S. PATENT DOCUMENTS

| | | | |
|---|---|---|---|
| 5,359,387 A * | 10/1994 | Hicks ................... 355/40 |
| 2004/0156072 A1* | 8/2004 | Bolloni ............... 358/1.15 |
| 2005/0043844 A1 | 2/2005 | Wiechers et al. |
| 2005/0043845 A1 | 2/2005 | Wiechers |
| 2005/0043848 A1 | 2/2005 | Wiechers |
| 2005/0185204 A1* | 8/2005 | Shelton et al. ....... 358/1.13 |
| 2005/0219561 A1* | 10/2005 | Haikin ................ 358/1.9 |
| 2006/0044581 A1* | 3/2006 | Cavill et al. ......... 358/1.12 |
| 2007/0000402 A1* | 1/2007 | Abrott ................ 101/483 |
| 2007/0036598 A1* | 2/2007 | Toda .................. 400/62 |
| 2007/0070383 A1* | 3/2007 | Fujimori et al. ..... 358/1.13 |

* cited by examiner

*Primary Examiner* — Sudhanshu Pathak
*Assistant Examiner* — Miya J Cato

(57) ABSTRACT

A method for configuring a printer to automatically print multiple proof prints includes configuring a printer with an adjustable process parameter to a first value, configuring the adjustable process parameter to a second value; generating a single submission event that expresses the first value and the second value of the adjustable process parameter, and configuring the printer with the single submission event such that the printer automatically prints a first proof print with the first value and a second proof print with the second value.

18 Claims, 6 Drawing Sheets

CONFIGURABLE SINGLE SUBMISSION EVENT PRINTER

BACKGROUND

In a printing system, such as a digital press, printed product quality may be evaluated before executing a print job. A relatively small number of proofs may be printed on a digital press for the purpose of assessing print quality and cost. Higher print quality may be achieved through higher cost. Lower print quality may be achieved through lower cost. An acceptable print quality may be achieved at a reasonable cost. It may be advantageous to print a relatively small number of proofs to establish quality and cost capabilities before executing the print job, which may have a relatively high number of prints. However, the process of adjusting process parameters, printing proofs, and providing pricing information is complicated, tedious, error prone, and costly.

There is demand to simplify the process of printing and associating pricing information with proofs.

DETAILED DESCRIPTION

In the present application, an embodiment of a printing system relates to configuring a digital press with a single submission event to produce two or more proof prints. The two or more proof prints may result from a matrix of process parameters and process parameter values in the digital press. For instance, one of the process parameters may be image resolution. Process parameter values of 200, 400, 600, 800, or 1200 dpi (dots per inch) may be associated with the process parameter of resolution. A management information system may provide the digital press with pricing information. Pricing information may include volume and cost scenarios. Information may be printed on a proof. The proofs may be finished into a document by an in-line finisher.

Figure 1:
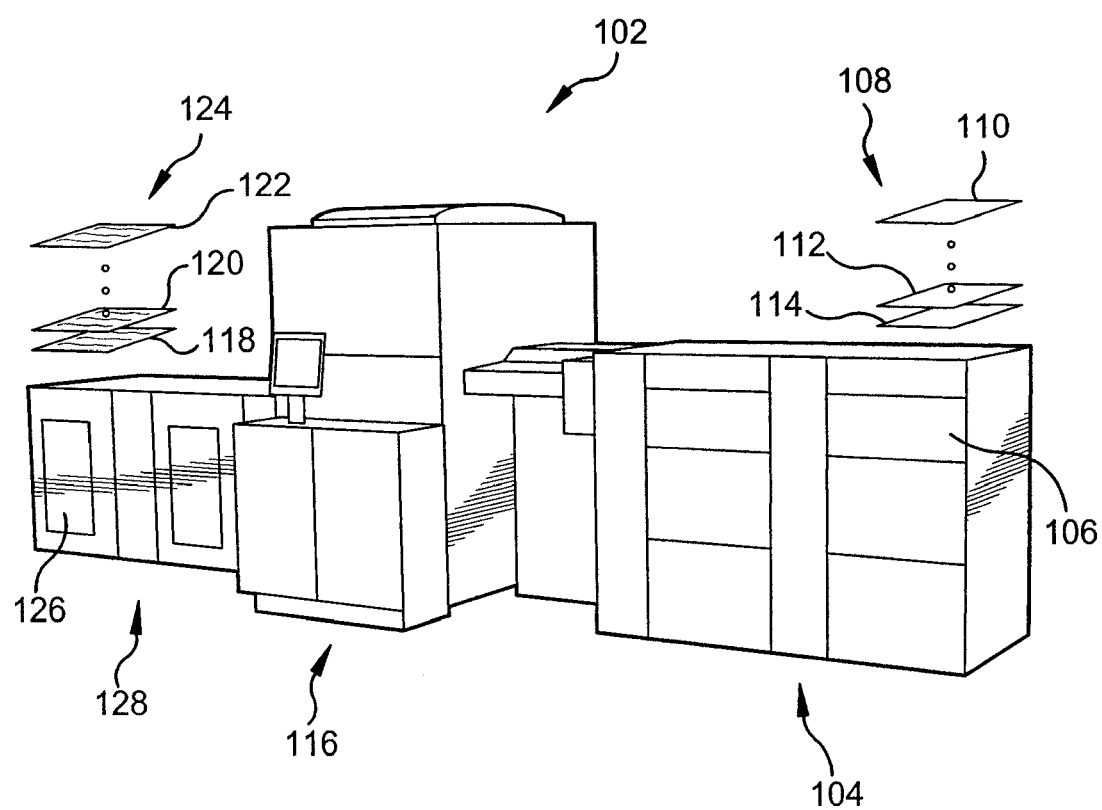
FIG. 1 shows an example of a digital press according to an embodiment of the present invention.

FIG. 1 shows an example of a digital press according to an embodiment of the present invention.

The digital press 102 may include six drawers 104. Although 6 drawers are shown, more or less drawers may be present. A drawer 106 may contain a stack of media 108. The stack of media 108 may include individual sheets of media 110, 112, and 114. The individual sheets of media 110, 112, and 114 may be paper or another type of printable substrate.

During operation, sheets of media 110, 112, and 114 are transported to the print engine 116 of the digital press 102. The print engine 116 includes binary ink developers, inks, optics, image processors, and communication processors (not shown) to print a digital image on the sheets of media 110, 112, and 114. Printed sheets of media 118, 120, and 122, may form a printed stack of media 124. The printed stack of media 124 can be stacked in a stacker 126. Two stackers 128 are shown, however, more or less than two stackers may be present. Both sides of the printed sheets of media 118, 120, and 122 may be printed on. An in-line finisher (not shown) may be placed after the print engine 116, but before the stackers 128 to bind or organize the proof prints into a document.

Figure 2:
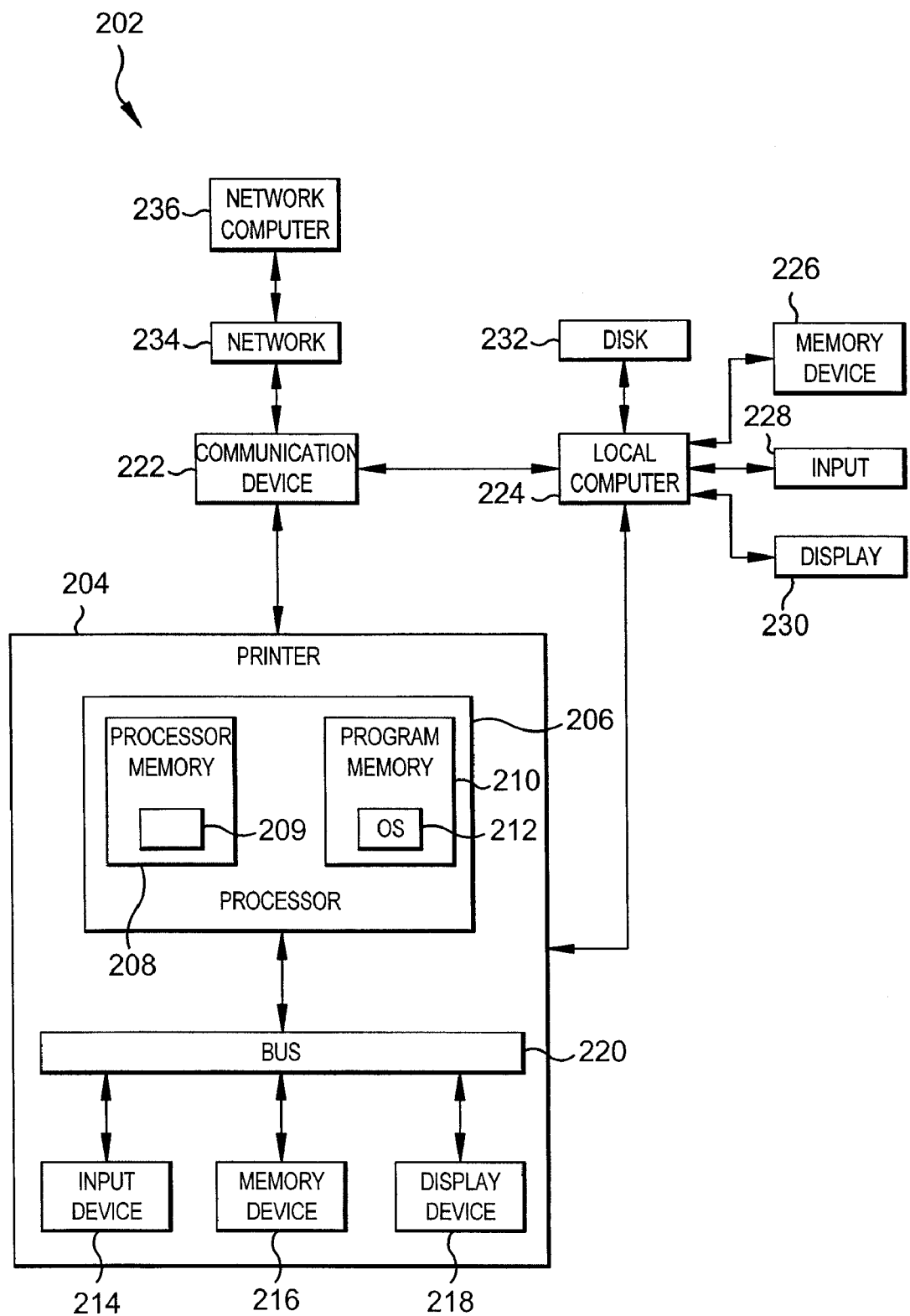
FIG. 2 is a block diagram of a printing system according to an embodiment of the present invention.

FIG. 2 is a block diagram of a printing system according to an embodiment of the present invention.

The block diagram 202 shows a printer having a processor 206. The processor 206 may include processor memory 208 such as dynamic non-volatile memory, or the like. The processor memory 208 may include instructions for a single submission event 209. The single submission event 209 may be sent to the printer after compiling values of the selected process parameters. Selected process parameters include: substrate type, color space, resolution, lightness, darkness, and contrast. The values of the selected process parameters are correspondingly: the different types of substrates, the inks used in the color space, the spatial resolution dots per inch (dpi), and the degree of lightness, darkness, and contrast for the image.

The single submission event 209 may also reside in program memory 210, the memory of a local computer 224, the memory device associated with a network computer 236, a disk 232 of a local computer 224, a memory device 226 of a local computer 224, a memory device 216 on a bus 220 of the printer, or combinations thereof. The processor 206 may also include program memory 210 and an operating system 212. The processor may communicate with an input device 214, such as a mouse, a keyboard, and so forth; a memory device 216 such as a Universal Serial Bus memory module or the like; and a display device 218 such as a Liquid Crystal Display or Cathode Ray Tube monitor through a bus 220. The processor 206 may be programmed by a processor readable medium such as a disk 232, which may be a hard disk, a Digital Versatile Disk, or the like. The processor 206 may also be programmed by a processor readable medium such as a first memory device 216. The first memory device 216 may be a flash memory, a memory stick, or another type of memory which may include machine readable instructions. The processor 206 may also be programmed by a second memory device 226. The processor 206 may also be programmed over a network 234.

The printer 204 may communicate through a communication device 222 such as a Universal Asynchronous Receiver/Transmitter, a Modulator-Demodulator (Modem), an Ethernet port, or the like. A local computer 224 may communicate with the printer 204 through the communication device 222 or directly to the bus 220, or by another method. The local computer 224 may have internal or external memory 226 or both. The local computer 224 may have input devices 228 such as a mouse, a keyboard, or the like. The local computer 224 may have a display 230 such as, but not limited to a LCD or CRT monitor. The local computer 224 may have a local or remote disk drive 232.

The printer 204 may be connected to a network 234 such as a Local Area Network. Local Area Networks may have routers, servers, or the like for routing information to a world wide web. A network computer 236 may communicate to the printer 204 through the network 234 and the communication device 222 or by another method.

The disk drive 232 may include information or instruction sequences, or both which may be communicated to the printer 204 for configuring and/or programming the printer 204 to perform a series of steps or acts. The information or instruction sequences may be communicated individually to the printer 204; communicated to the printer 204 in a batch; or communicated to the printer both individually and in a batch. Information and/or instruction sequences may be stored in processor memory 208, program memory 210, a memory device 216, or combinations thereof. The information to configure and/or program the printer may be routed through a network 234.

Figure 3:
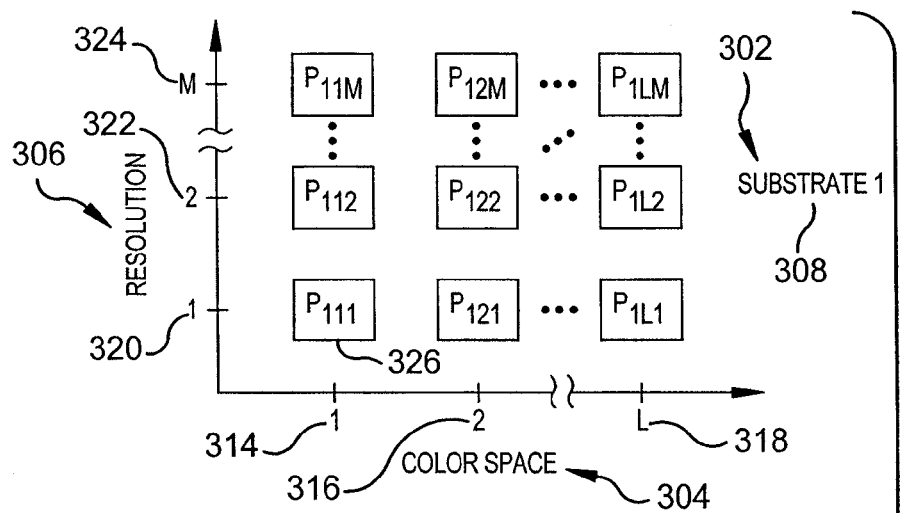
FIG. 3 illustrates process parameters having multiple values according to an embodiment of the present invention.
Figure 3:
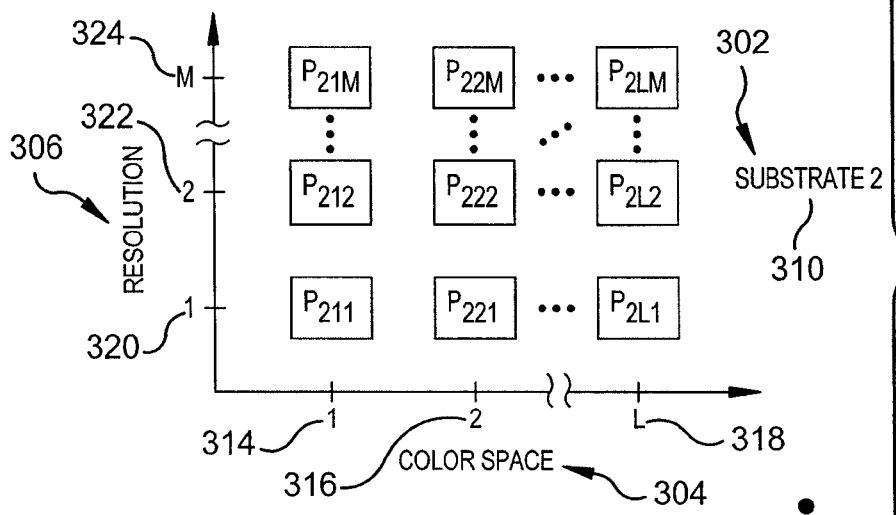
Figure 3:
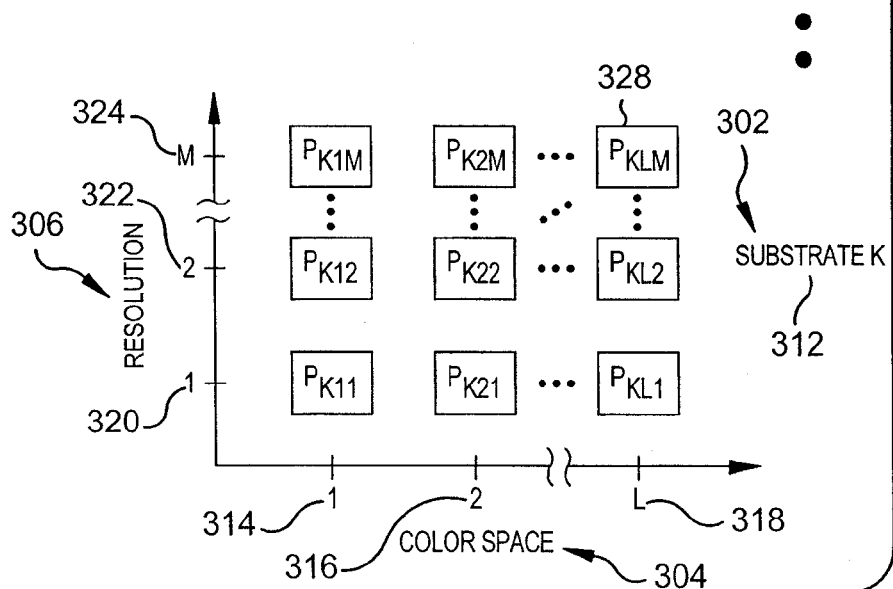

FIG. 3 illustrates process parameters having multiple values according to an embodiment of the present invention. Examples of process parameters are a substrate 302 which may be chosen from a type of media, a color space 304, and a resolution 306. Other process parameters (not shown) include lightness, darkness, and contrast. The process parameters may be adjusted automatically by a single submission event.

An INDIGO digital press is a digital printer. The INDIGO 5500 digital press has the capability to print on up to 16 different types of substrates (when configured with four feeder units), with up to 7 different inks, and 5 resolutions. Each print can be programmably and electronically selected and re-configured using a different type of substrate, a different ink color set, and a different resolution. Other print parameters such as lightness, darkness, and contrast may also be adjusted.

The substrate 302 may be a media type such as a piece of paper, a film, a transparency film, or the like. For instance, substrate$_1$, 308 may be paper such as HP INDIGO 100 grams per square meter uncoated. Substrate$_2$, 310 may be paper such as HP INDIGO 100 grams per square meter matte. Substrate$_K$, 312 may be paper such as HP INDIGO 100 grams per square meter gloss. The substrate 302 is a process parameter. Each of the substrate choices: substrate$_1$ 308, substrate$_2$ 310, and substrate$_K$ 312 are selected values of the substrate 302 process parameter.

The color space 304 may include different inks. For example, color space$_1$ 314 may include Cyan, Yellow, Magenta, and Black (K) inks. Color space$_2$ 316 may include Cyan, Magenta, Yellow, Black, light cyan, and light magenta inks. Color space$_L$ 318 may be an INDICHROME color space including Cyan, Magenta, Yellow, Black, Orange, Violet, and light magenta inks. Other colors may be used such as spot colors. Spot colors are colors which render a predetermined color which is true rather than attempting to render the predetermined color with a composition of spatially distributed dots of cyan, yellow, magenta, black, or other colors. The color space 304 is a process parameter. Each of the color space choices may be selected and adjusted. Color space$_1$ 314, color space$_2$ 316, and color space$_L$ 318 are values of the color space 304 process parameter.

The resolution, 306 may include different spatially distributed dot spacing. For example, resolution$_1$, 320 may have a dot spacing of 200 dots per inch, resolution$_2$, 322 may have a dot spacing of 400 dots per inch, and resolution$_M$ 324 may have a dot spacing of 1200 dots per inch. The resolution 306 is a process parameter. Each of the resolution choices may be selected and adjusted. Resolution$_1$ 320, resolution$_2$ 322, and resolution$_M$ 324 are values of the resolution 306 process parameter.

As an example, a first proof print may be printed using process space $P_{111}$ 326. The subscripts refer to the values of the process parameter. Process space $P_{111}$ 326 may have: substrate$_1$, 308 as an HP INDIGO 100 grams per square meter uncoated paper; color space$_1$ 314 with Cyan, Yellow, Magenta, and Black (K) inks; and resolution$_1$ 320 with a dot spacing of 200 dots per inch. A second proof print may be printed using process space $P_{KLM}$ 328. Process space $P_{KLM}$ 328 may have: substrate$_K$ 312 as an HP INDIGO 100 grams per square meter gloss paper; color space$_L$ 318 as INDICHROME Cyan, Magenta, Yellow, Black, Orange, Violet, and light magenta ink; and resolution$_M$ 324 as 1200 dots per inch. Other combinations of the values of substrates 302, color space 304, and resolution 306 may be chosen for a proof print.

Figure 4:
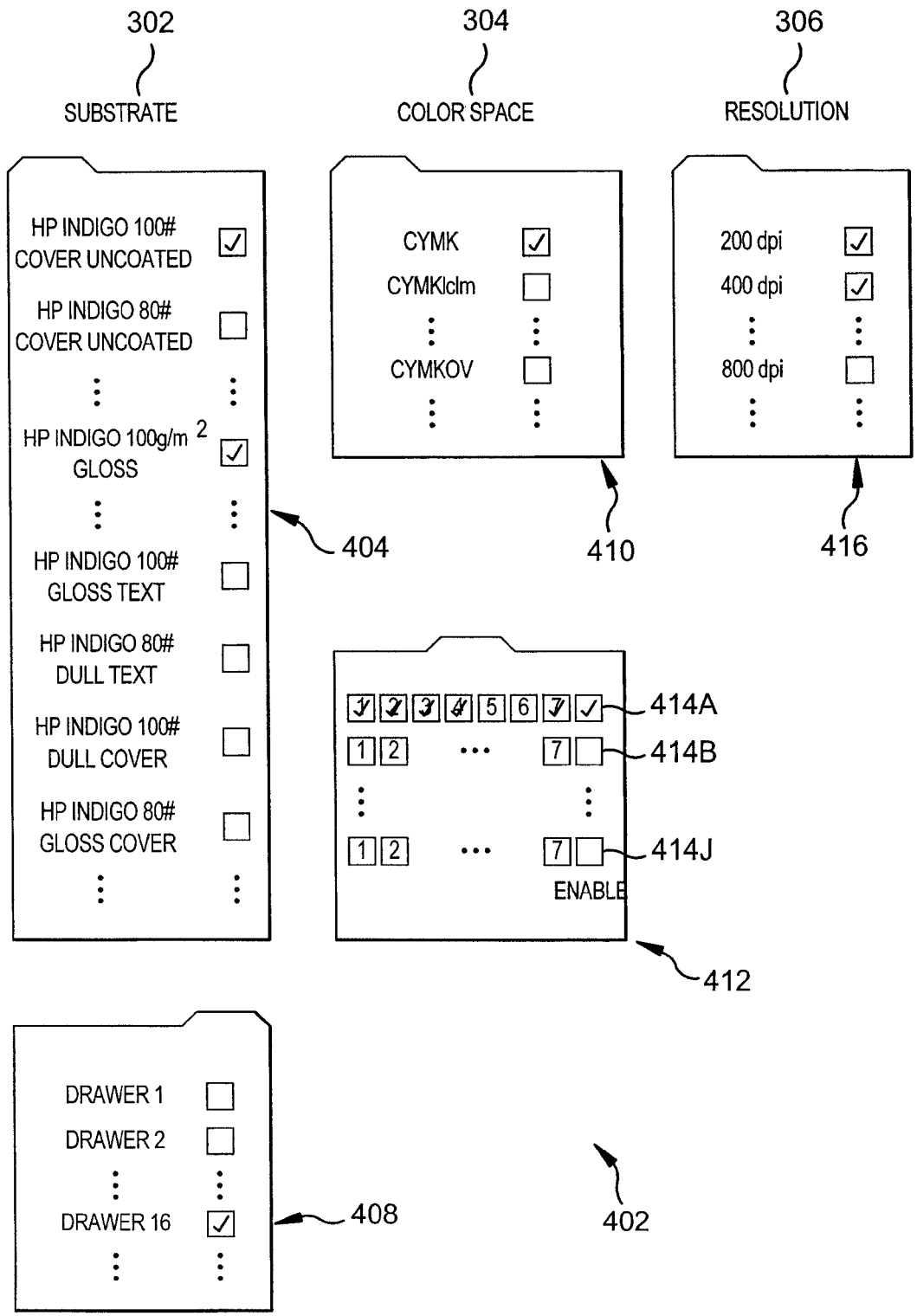
FIG. 4 shows forms for configuring a digital press according to an embodiment of the present invention.

FIG. 4 shows forms for configuring a digital press according to an embodiment of the present invention. The forms 402 can be presented as a graphical user interface. The graphical user interface may be formed by the blocks described in reference to FIG. 2 such as the processor 206, the display device 218, and the input device 214; however, the graphical user interface is not limited to the blocks shown in FIG. 2.

The forms 402 include process parameters; the user may select a value of the process parameter from a form 404, 408, 410, 412, and 416 as described below. Other values of process parameters may be chosen from a scrollable list (not shown), or input to the form in a text box (not shown).

Three process parameters are illustrated in FIG. 4. The three process parameters are a substrate 302, a color space 304, and a resolution 306. Each of the substrate 302, the color space 304, and the resolution 306 may have selectable values for each of these process parameters. Other process parameters, which are not shown, can be selected, for example: lightness, darkness, and contrast.

The substrate may be selected from the values presented in form 404, such as predetermined media types. For example: HP INDIGO 100# cover uncoated, HP INDIGO 80# cover uncoated, HP INDIGO 100 grams per square meter gloss, HP INDIGO 100# gloss text, HP INDIGO 80# dull text, HP INDIGO 100# dull cover, or HP INDIGO 80# gloss cover. In a situation where a substrate is not readily identifiable by the media type or the media properties as mentioned above, the substrate can also be selected in form 408 by a drawer number. The number of the drawer is a value associated with the process parameter substrate 302. For instance, drawer 1 may be selected having an experimental media type, whereas drawer 2 may have a standard media type, such as, but not limited to, HP INDIGO 80# dull text. Any one, a combination, or all drawer numbers may be selected.

The color space 304 is a process parameter. The color space 304 may be selected from predetermined ink color values as shown in form 410. A predetermined value may be Cyan, Yellow, Magenta, and Black (K); Cyan, Yellow, Magenta, light cyan, and light magenta; Cyan, Yellow, Magenta, Black (K), Orange, and Violet; or another color combination. Spot colors, such as a custom color, a metallic looking color, or the like, may also be used to render an image having an ink other than the standard ink colors of Cyan, Yellow, Magenta, and Black. The color space may also be determined by selecting inks from the ink deposition stations using form 412. In the HP INDIGO digital press, the ink deposition stations are binary ink developers. There are seven binary ink developers in a HP INDIGO 5500 press. Any one or all of the binary ink developers may be selected. The binary ink developers may be filled with custom inks and printed on a substrate 302 (see FIG. 3)—such as sheets of media 118, 120, or 122 (see FIG. 1)—to render specialty images. In form 412, any of the numbers 1 through 7 may be selected corresponding to the color and type of ink in the binary ink developer. When all of the numbers are selected, all of the binary ink developers deposit ink on the substrate. When a subset of binary ink developers are selected, the selected subset of binary ink developers deposit ink on the substrate. The selected number of binary ink developers is enabled by selecting area 414A, 414B, 414J, or the like. For example, if area 414A is selected, then only the selected binary ink developers 1-7 in the row of 414A will deposit ink on the substrate. In this example, the binary ink developers one through four and seven are checked so that binary ink developers one through four and seven may deposit ink on the substrate.

The resolution 306 is a process parameter. The resolution 306 may be selected from form 416 as 200 dpi (dots per inch), 400 dpi, 800 dpi, or another dot per inch value.

As an example, consider a matrix of proof prints according to the selection of the checked areas in FIG. 4. Three values of substrates 302 are selected (check marks) from the process parameter substrate 302 in forms 404 and 408. The values of the process parameter substrate 302 are HP INDIGO 100# cover uncoated paper, HP INDIGO 100 grams per square meter gloss paper, and drawer 16. Two values from the process parameter color space 304 are selected (check marks) from the process parameter color space 304 in forms 410 and 412. The values of the process parameter color space 304 are Cyan, Yellow, Magenta, and Black (K); and colors from binary ink developers 1, 2, 3, 4 and 7. These colors are selected by checking the enable box 414A. Two values from resolution 306 are selected (check marks) from form 416. The values of the process parameter resolution 306 are 200 dpi and 400 dpi.

Drawer 16 may hold specialty, experimental, or another type of media. The selected values of colors from binary ink developers 1, 2, 3, 4, and 7, are enabled by selecting (check mark) area 414A. Ink in binary ink developers 1, 2, 3, and 4 may be Cyan, Yellow, Magenta, and Black. Ink in binary ink developer 7 may be an HP blue ink which can be used when printing an HP logo or HP letterhead.

When the matrix of the three substrates, the two color spaces, and the two resolutions have been selected, this information is processed and sent to the printer as a single submission event. The single submission event automatically configures the proofs to be printed with the combinations of the values selected from the adjustable process parameters; in this case: 3 types of substrates, 2 types of color spaces, and 2 types of resolutions, for a total combination of 12 proof prints. The single submission event configures the printer to print multiple proof prints. The proof prints may be compared with each other to assess quality, price, and other factors. Other binary ink developers may be selected by checking the enable boxes 414B through 414J, and selecting one or all of the binary ink developers, one through seven in the enabled row.

Figure 5:
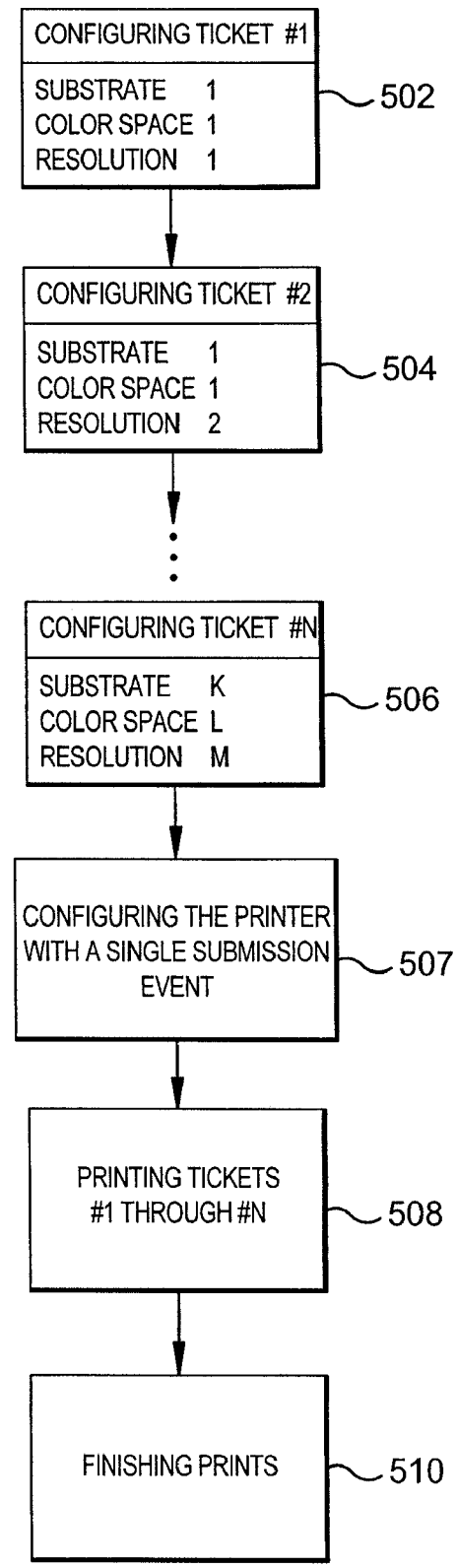
FIG. 5 is a flowchart illustrating job tickets with parameter values, configuring a printer with a single submission event, printing the tickets, and finishing the prints according to an embodiment of the present invention.

FIG. 5 is a flowchart illustrating job tickets with parameter values, configuring a printer with a single submission event, printing the tickets, and finishing the prints according to an embodiment of the present invention. The example given in reference to FIG. 4 provides a specific example of proof prints. FIG. 5 illustrates the possibility of a larger matrix of print values.

Printing systems may use a ticket which is associated with a particular print job. A ticket number can be associated with a particular proof print. The ticket is configured from the information selected in FIG. 4.

In block 502, $ticket_1$ is configured to be printed with the first values selected from process parameters of a substrate, a color space, and a resolution. The values selected for $ticket_1$ corresponds to HP INDIGO 100# cover uncoated paper for the process parameter substrate 302 (see FIG. 4); Cyan, Yellow, Magenta, and Black (K) for the process parameter color space 304 (see FIG. 4); and 200 dpi for the process parameter resolution 306 (see FIG. 4).

In block 504, $ticket_2$ 504 is configured to correspond to HP INDIGO 100# cover uncoated paper for the process parameter substrate 302 (see FIG. 4); Cyan, Yellow, Magenta, and Black (K) for the process parameter color space 304 (see FIG. 4); and 400 dpi for the process parameter resolution 306 (see FIG. 4). After block 504, tickets may be configured to correspond to other process parameter substrates 302, color spaces 304, or resolutions 306 as shown in FIG. 4.

In block 506, the values selected for $ticket_N$ are configured to include the $K^{th}$ substrate, the $L^{th}$ color space, and the $M^{th}$ resolution.

In block 507, the values of the printer process parameters which have been selected are automatically configured into a single submission event. The printer is configured to receive the single submission event and automatically adjust the process parameters in response to the single submission event.

In block 508, when all the tickets have been configured, the single submission event is sent to the printer to automatically print tickets 1 through N and therefore the selected proof prints; for instance, printed sheets of media 118, 120, and 122 as shown in FIG. 1.

In block 510, the proof prints may be finished by an in-line finisher after being printed by the print engine 116 (see FIG. 1) and before being sent to one of the stackers 128. Finishing may take the form of binding, spiraling, stapling, or the like. A finisher may be located between the print engine 116 and the stackers 128 as shown in FIG. 1. The in-line finisher may be configured from a local computer, 224 (see FIG. 2), a network computer 236, an input device 214 or 228, a memory device 216, or the like, as shown in FIG. 2.

Figure 6:
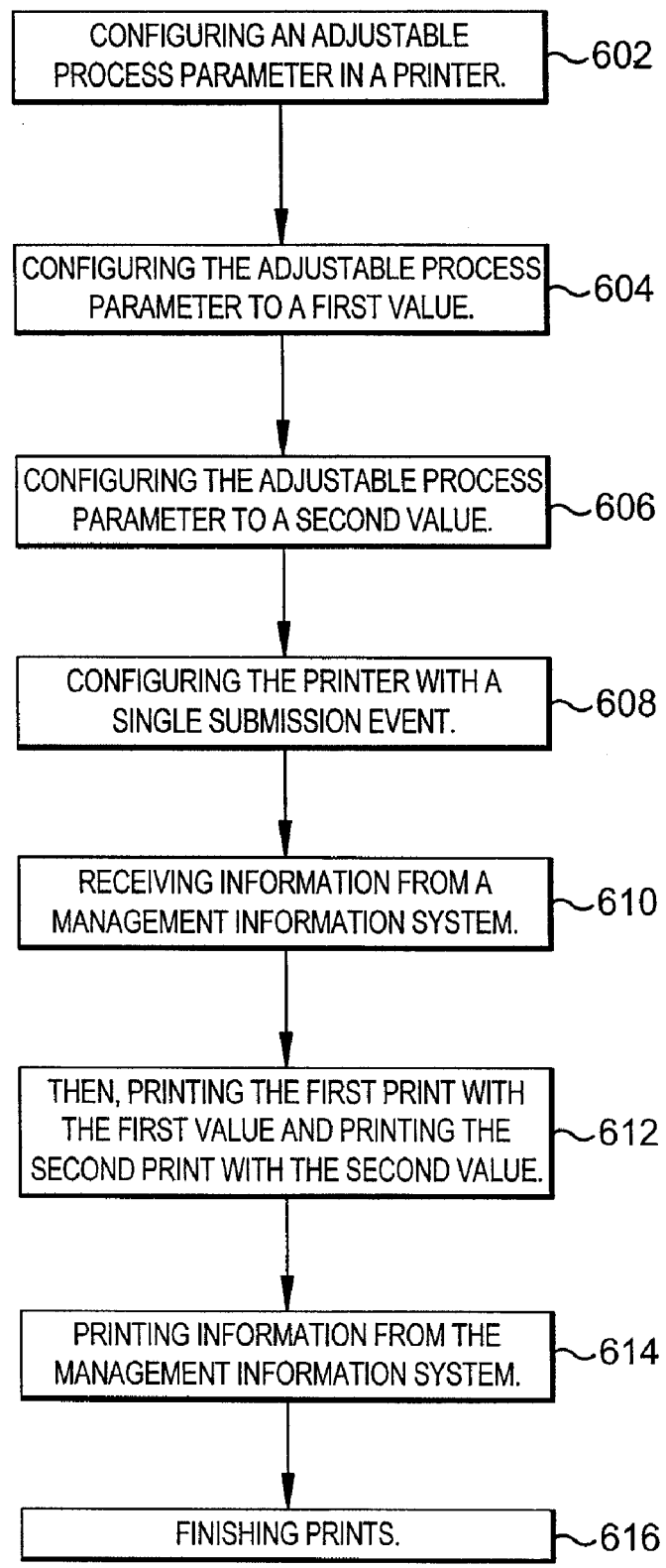
FIG. 6 is a flowchart illustrating a method to configure a printing system with a single submission event according to an embodiment of the present invention.

FIG. 6 is a flowchart illustrating a method to configure a printing system with a single submission event according to an embodiment of the present invention. In block 602, an adjustable process parameter, which may be adjusted, such as substrate type 302 (see FIGS. 3 and 4), color space 304, resolution 306, contrast, darkness, lightness, or the like is configured for a printer. The configuration may be by way of a graphical user interface having forms 402 (see FIG. 4), where values of the adjustable process parameter may be selected. Selected values of the adjustable process parameter may be included in a job ticket 502, 504, or 506 as shown in FIG. 5.

In block 604, the adjustable process parameter may be adjusted to a first value. For example, the process parameter substrate may be adjusted to select a media type of HP INDIGO 100# cover uncoated paper (see FIG. 4, form 404).

In block 606, the adjustable process parameter may be adjusted to a second value. As an example, the process parameter substrate may be adjusted to select a media type of HP INDIGO 100 grams per square meter gloss paper (see FIG. 4, form 404).

In block 608, the printer is configured with a single submission event. The information from the forms 402 (see FIG. 4) is configured to create a combination of the selected values from the process parameters. The single submission event may be formed from a high level scripting language.

In block 610, the information configured to be printed may be sent to a management information system to obtain pricing information, such as the cost of ink, substrates, printer processing time, or the like. The information from the management information system may be received by the printer and printed on the substrate to form a proof print such as printed sheets of media 118, 120, or 122 as shown in FIG. 1. The information may be printed on the proof sheet. The information may also be stored in a database, in network computer 236 (see FIG. 2), a local computer 224, a memory device 226, a disk 232, and so forth. The information from the management information system may be received over a network, a local disk, or by another method of receiving information from a management information system and downloaded to the printer memory.

In block 612, after the printer is configured with a single submission event, then the printer prints the first print with the first value of the process parameter, the second print with the second value of the process parameter and so forth. For example, as a first substrate value, the printer may print on HP INDIGO 100# cover uncoated paper (see FIG. 4, form 404) and then, as a second substrate value, the printer may print on HP INDIGO 100 grams per square meter gloss paper (see FIG. 4, form 404). Other values of process parameters may be printed, such as color space, resolution, lightness, darkness, and contrast. The possible print combinations are described in reference to FIG. 3. Print combinations may be sequenced as tickets as shown in FIG. 5.

In block 614, the printer may print information from a management information system. The information from the management information system may include pricing information such as quantity, cost of supplies, or the like. The pricing information may be printed on a substrate, such as a sheet of media 118, 120, or 122 as shown in FIG. 1. The sheet of media 118, 120, or 122 may be a proof print. The information may be printed on the front or the back of the proof print. The information may also be printed on a summary sheet. An index or reference designator may be printed on the proof print and the summary sheet to link the information to the proof print. An example of an index or reference designator is the number one for the first proof print, the number two for the second proof print, and so on. The values of the process parameter such as substrate type, color space, resolution, lightness, darkness, contrast and the like may be directly printed on the proof print or printed on a summary sheet and linked to the proof print with the index or reference designator.

In block 616, the printer may have an in-line finisher. The in-line finisher is an apparatus which can bind, staple, or affix printed sheets of media 118, 120, or 122 (see FIG. 1) to each other. The in-line finisher (not shown) may be located between the print engine 116 and the stackers 128. The in-line finisher may be configured to order and finish proof prints from a local computer 224 (see FIG. 2), a network computer 236, an input device 214 or 228, a memory device 216, a disk 232 or the like, as shown in FIG. 2.

While the present embodiments of a printing system have been particularly shown and described, those skilled in the art will understand that many variations may be made therein without departing from the spirit and scope of the embodiments defined in the following claims. The description of the embodiment is understood to include all novel and non-obvious combinations of elements described herein, and claims may be presented in this or a later application to any novel and non-obvious combination of these elements. The foregoing embodiments are illustrative, and no single feature or element would have to be included in all possible combinations that may be claimed in this or a later application. Where the claims recite "a" or "a first" element of the equivalent thereof, such claims should be understood to include incorporation of one or more such elements, neither specifically including nor excluding two or more such elements. Although exemplary embodiments of a printing system have been described, the application is not limited and may include producing a proof print from a digital printer, a photocopier, a facsimile machine, or the like.

What is claimed is:

1. A method for configuring a printer to automatically print multiple proof prints, comprising:
    configuring an adjustable process parameter to a first value in a first job ticket for a first proof print;
    configuring the adjustable process parameter to a second value in a second job ticket for a second proof print;
    generating a single submission event that expresses the first job ticket including the first value and the second job ticket including the second value of the adjustable process parameter;
    receiving information associated with the adjustable process parameter for an individual proof print from a management information system different from a source of the single submission event and from the printer, the information to be printed on the individual proof print; and
    configuring the printer with the single submission event such that the printer automatically prints the first proof print using the first value and the second proof print using the second value.

2. The method in claim 1, wherein the printed information on the proof print is an index that links the proof print to a summary sheet having printed thereon the process parameter value used to print the individual proof print.

3. The method in claim 2, wherein the summary sheet is printed after the proof print has been printed.

4. The method in claim 1, where the adjustable process parameter includes one or more of a media type, a resolution, or combinations thereof.

5. The method in claim 1, further comprising:
    configuring an in-line finishing device in the printer, whereby the in-line finishing device finishes prints.

6. The method of claim 1, wherein configuring the printer is by a graphical user interface.

7. The method in claim 1, wherein the information printed on the individual proof sheet comprises pricing information that informs a user of a cost to produce one or more final prints according to the process parameter value used to print the individual proof print.

8. The method in claim 1, wherein the information printed on the proof sheet is an index that links the proof print to a summary sheet having printed thereon pricing information that informs a user of a cost to produce one or more final prints according to the process parameter value used to print the proof print.

9. A printing system, comprising:
    a single submission event configured with a plurality of job tickets each having a printer process parameter value;
    means to receive information associated with the process parameter value of an individual proof print from a management information system different from a source of the single submission event and from the printing system, the information to be printed on the individual proof print; and
    a printer configured to receive the single submission event and to print a first proof print using a first process parameter value from a first one of the job tickets and a second proof print using a second process parameter value from a second one of the job tickets.

10. The printing system in claim 9, wherein the means to print the information from the management information system includes a means to print on the individual proof print pricing information that informs a user of a cost to produce one or more final prints according to the process parameter value of the individual proof print.

11. The printing system in claim 9, further comprising:
    means to configure an in-line finishing device in a printer.

12. The printing system in claim 9, wherein adjusting printer process parameter values includes means for adjusting one or more of a resolution, a media type, or combinations thereof.

13. The printing system in claim 9, wherein configuring a printer to receive a single submission event for adjusting printer process parameter values includes a graphical user interface.

14. The printing system in claim 9, wherein the information printed on the individual proof print comprises an index that links the proof print to a summary sheet printed after the proof print has been printed, the summary sheet having printed thereon at least one of (a) the process parameter value used to print the proof print, or (b) pricing information that informs a user of a cost to produce one or more final prints according to the process parameter value used to print the individual proof print.

15. At least one non-transitory computer readable medium comprising computer executable instructions which direct a computer to perform the acts of:
    configuring a printer with a single submission event having a plurality of job tickets, each job ticket defining a value for an_adjustable process parameter;
    receiving information associated with the adjustable process parameter for an individual proof print from a management information system different from the computer and the printer, the information to be printed on the individual proof print;
    configuring the adjustable process parameter to a first value in a first job ticket for a first proof print;
    configuring the adjustable process parameter to a second value in a second job ticket for a second proof print; and
    printing the first proof print using the first value and printing the second proof print using the second value.

16. The computer readable medium in claim 15, further comprising:
    one or more computer executable instructions which direct a document configuration system to perform the act of configuring an in-line finishing device in a printer.

17. The computer readable medium in claim 15, wherein the information printed on the proof print comprises pricing information that informs a user of a cost to produce one or more final prints according to the process parameter value used to print the individual proof print.

18. The computer readable medium in claim 15, wherein the information printed on the proof print comprises an index that links the proof print to a summary sheet printed after the proof print has been printed, the summary sheet having printed thereon at least one of (a) the process parameter value used to print the proof print, or (b) pricing information that informs a user of a cost to produce one or more final prints according to the process parameter value used to print the individual proof print.

* * * * *

UNITED STATES PATENT AND TRADEMARK OFFICE
CERTIFICATE OF CORRECTION

| | | |
|---|---|---|
| PATENT NO. | : 8,049,910 B2 | Page 1 of 1 |
| APPLICATION NO. | : 11/741928 | |
| DATED | : November 1, 2011 | |
| INVENTOR(S) | : Orhan E Beckman et al. | |

It is certified that error appears in the above-identified patent and that said Letters Patent is hereby corrected as shown below:

In column 9, line 23, in Claim 15, delete "an_adjustable" and insert -- an adjustable --, therefor.

Signed and Sealed this
Tenth Day of July, 2012

David J. Kappos
*Director of the United States Patent and Trademark Office*